United States Patent [19]

Saoyama et al.

[11] Patent Number: 5,076,715
[45] Date of Patent: Dec. 31, 1991

[54] LINEAR MOTION GUIDE UNIT WITH A RACK AND PINION MECHANISM

[75] Inventors: Kazuhiko Saoyama, Yokohama; Yoshihisa Inoue, Han-no; Haruyoshi Endo, Higashi-murayama, all of Japan

[73] Assignees: Nippon Thompson Co., Ltd.; Nakamichi Corporation, both of Tokyo, Japan

[21] Appl. No.: 541,116

[22] Filed: Jun. 19, 1990

[30] Foreign Application Priority Data

Jun. 19, 1989 [JP] Japan .................................. 1-154422

[51] Int. Cl.⁵ .............................................. F16C 29/04
[52] U.S. Cl. .......................................... 384/49; 384/18
[58] Field of Search .......................... 384/18, 49, 50, 51

[56] References Cited

U.S. PATENT DOCUMENTS

| | | | |
|---|---|---|---|
| 3,857,618 | 12/1974 | Hagen et al. | 384/18 |
| 3,912,341 | 10/1975 | Stein | 384/18 |
| 3,975,063 | 8/1976 | Mahotka et al. | 384/18 |
| 4,929,097 | 5/1990 | Mottate | 384/49 |

*Primary Examiner*—Thomas R. Hannon
*Attorney, Agent, or Firm*—Skjerven, Morrill, MacPherson, Franklin & Friel

[57] ABSTRACT

A linear motion guide unit having a rack and pinion mechanism for preventing slippage in relative sliding motion is provided. The linear motion guide unit includes a table elongated in shape and having a generally U-shaped cross section and a bed elongated in shape and having a generally U-shaped cross section which is oriented with its inner surface facing the inner surface of the table. The unit also includes a plurality of balls sandwiched between the table and the bed so as to provide a rolling contact therebetween. Also provided is a retainer having a horizontal section and a pair of vertical sections extending from the opposite sides of the horizontal section and formed with a plurality of windows for receiving therein the balls. The horizontal section of the retainer is formed with a slot and a pinion gear is rotatably supported on the retainer as extending partly through the slot and at the center in the widthwise direction of the retainer. A pair of top and bottom racks are mounted on the table and the bed, respectively, such that the pinion gear is in mesh with both of the top and bottom racks.

7 Claims, 6 Drawing Sheets

LINEAR MOTION GUIDE UNIT WITH A RACK AND PINION MECHANISM

BACKGROUND OF THE INVENTION

1. Field of the Invention

This invention generally relates to a linear motion guide unit, and, in particular, to a finite linear motion guide unit having a rack and pinion mechanism.

2. Description of the Prior Art

A finite linear motion guide unit having a rack and pinion structure is known and a typical prior art example is described in the U.S. Pat. No. 3,857,618 issued to Hagen et al. on Dec. 31, 1974. However, in the structure shown in this patent, since pinions are provided on both sides of a retainer in pairs, the meshing condition between the pinions and the associated racks may differ between left and right when the retainer is deformed due to some external forces, whereby a resistance against movement could be increased. Moreover, since the pinions are provided in pairs arranged side-by-side, the overall structure tends to be large and bulky so that there is a limit in making a linear motion guide unit compact in size. Besides, the linear motion guide unit shown in this patent is extremely complicated in structure and thus the manufacturing cost tends to be high. As a result, it was not possible to apply this type of linear motion guide unit to high precision devices, such as a head guide unit of a hard disc drive and a guide unit of a precision measuring apparatus.

SUMMARY OF THE INVENTION

In accordance with the present invention, there is provided an improved finite linear motion (LM) guide unit having a rack and pinion mechanism. The present LM guide unit includes a table and a bed, both elongated in shape and having a generally U-shaped cross section. The table and the bed are arranged with their inner surfaces facing opposite to each other. A pair of associated inner and outer longitudinally extending guide grooves is provided on opposite surfaces of the table and the bed. Also provided in the present LM guide unit is a retainer which has also a generally U-shaped cross section and which is provided with a plurality of windows for retaining therein balls which are also partly fitted in the associated guide grooves. And, at least one pinion gear is rotatably mounted at the center in the widthwise direction of the retainer with the rotating axis of the pinion gear extending horizontally and perpendicular to the longitudinal direction of the retainer. In addition, a top rack is fixedly mounted at the center in the widthwise direction of the table as extending in the longitudinal direction of the table. Similarly, a bottom rack is fixedly mounted at the center in the widthwise direction of the bed as extending in the longitudinal direction of the bed. Thus, when assembled, the pinion rotatably supported by the retainer is in mesh with both of the top and bottom racks so that relative motion between the table and the bed can be properly controlled and slippage in motion between the table and the bed is prevented from occurring.

As described above, in accordance with the present invention, since the pinion gear is provided at the center in the widthwise direction of the retainer and the top and bottom racks are fixedly mounted on the table and bed, respectively, so as to be mesh with the pinion gear, even if the retainer is elastically deformed for some reason due, for example, to application of external forces, the operative association between the pinion and the racks may be maintained virtually unchanged. Thus, fluctuations or an increase in the resistance against the motion in the present guide unit are minimized.

It is therefore a primary object of the present invention to provide an improved linear motion guide unit having a rack and pinion mechanism suitable for use in high precision devices.

Another object of the present invention is to provide an improved finite linear motion guide unit having a rack and pinion mechanism stable in operation, compact in size and low at cost.

Other objects, advantages and novel features of the present invention will become apparent from the following detailed description of the invention when considered in conjunction with the accompanying drawings.

BRIEF DESCRIPTION OF THE DRAWINGS

FIG. 1b is a bottom plan view of the linear motion guide unit shown in FIG. 1a;

FIG. 1c is a top plan view of the linear motion guide unite shown in FIG. 1a;

FIG. 2b is a top plan view of the retainer shown in FIG. 2a;

FIG. 2c is a side elevational view of the retainer shown in FIG. 2a;

FIG. 2d is a bottom plan view of the retainer shown in FIG. 2a;

FIG. 6b is a top plan view of the retainer shown in FIG. 6a;

FIG. 6c is a side elevational view of the retainer shown in FIG. 6a;

FIG. 6d is a bottom plan view of the retainer shown in FIG. 6a;

DESCRIPTION OF THE PREFERRED EMBODIMENTS

Figure 1A:
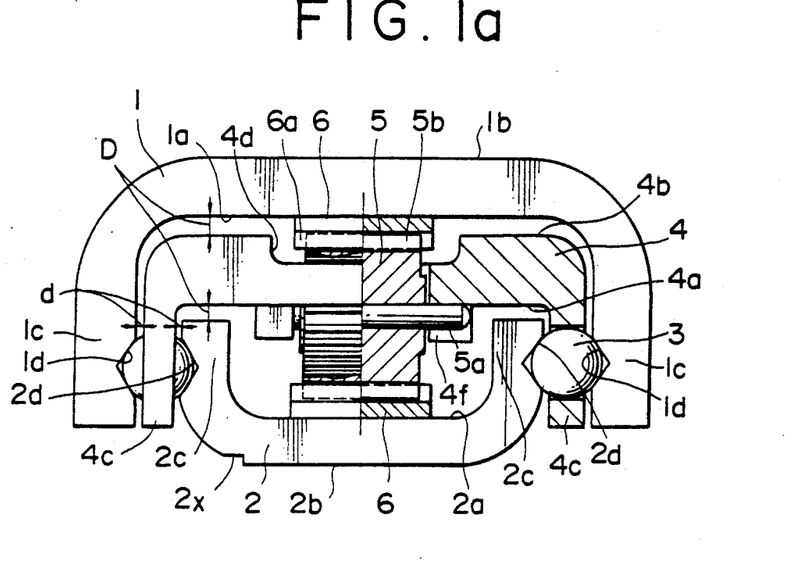
FIG. 1a is a schematic illustration showing in transverse cross section a linear motion guide unit constructed in accordance with one embodiment of the present invention.
Figure 1B:
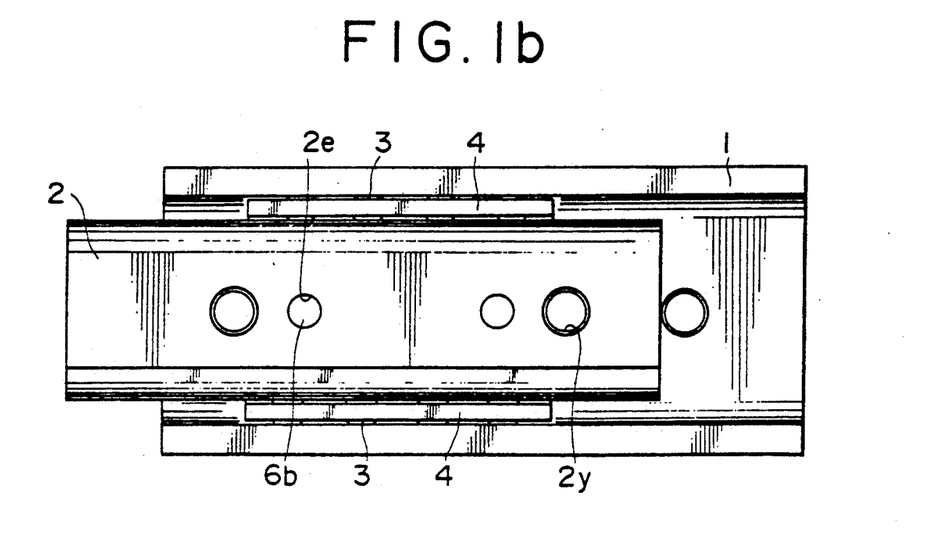
Figure 1C:
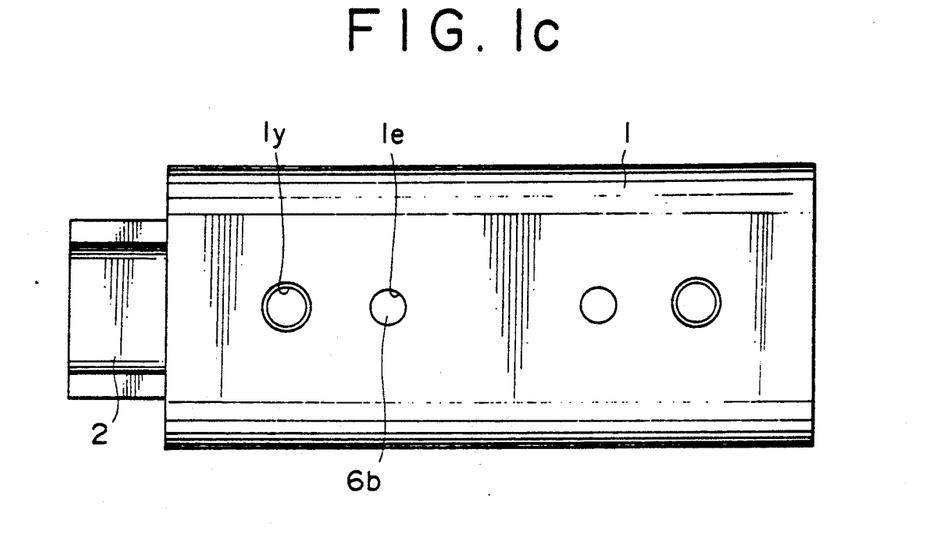

Referring now to FIGS. 1a–1c, 2a–2e, 3 and 4, there is schematically shown a finite linear motion guide unit 5 constructed in accordance with one embodiment of the present invention. As best shown in FIG. 1a, the present LM guide unit includes an elongated table 1 having a generally inverted U-shaped cross section and thus having a generally flat top section 1b and a pair of generally vertically depending side sections 1c, 1c on the opposite sides of the flat top section 1b. The present LM guide unit also includes an elongated bed 2 having a generally U-shaped cross section and thus having a generally flat bottom section 2b and a pair of generally vertically upstanding side sections 2c, 2c which extends upward from the opposite sides of the flat bottom section 2b. In the illustrated embodiment, the outer width of the bed 2, or the distance between the outer side surfaces of the pair of side sections 2c, 2c, is set smaller than the inner width of the table 1, or the distance between the inner surfaces of the pair of side sections 1c, 1c, by a predetermined amount so that a predetermined gap is set between the opposite inner and outer side surfaces of the side sections 1c and 2c, respectively. Thus, in the illustrated embodiment, the bed 2 oriented with its inner surface facing upward is generally located inside the space defined by the table 1 which is oriented with its inner surface facing downward.

An outer guide groove 1d is provided at the inner surface of each of the side sections 1c, 1c of the table 1 as extending in parallel with the longitudinal direction of the table 1. Similarly, an inner guide groove 2d is provided at the outer surface of each of the side sections 2c, 2c of the bed as extending in parallel with the longitudinal direction of the bed 2 and also located opposite to its associated outer guide groove 1d. Thus, an elongated guide channel is defined between a pair of outer and inner guide grooves 1d and 2d as extending in parallel with the longitudinal direction of the LM guide unit. The cross sectional shape of each of the outer and inner guide grooves 1d and 2d may take any desired form, in particular in consideration of the shape of rolling members fitted therein to provide a rolling contact between the table 1 and the bed 2. When the rolling members, such as balls, are located in the guide channels, a sliding relative motion can be provided between the table 1 and the bed 2.

Figure 2A:
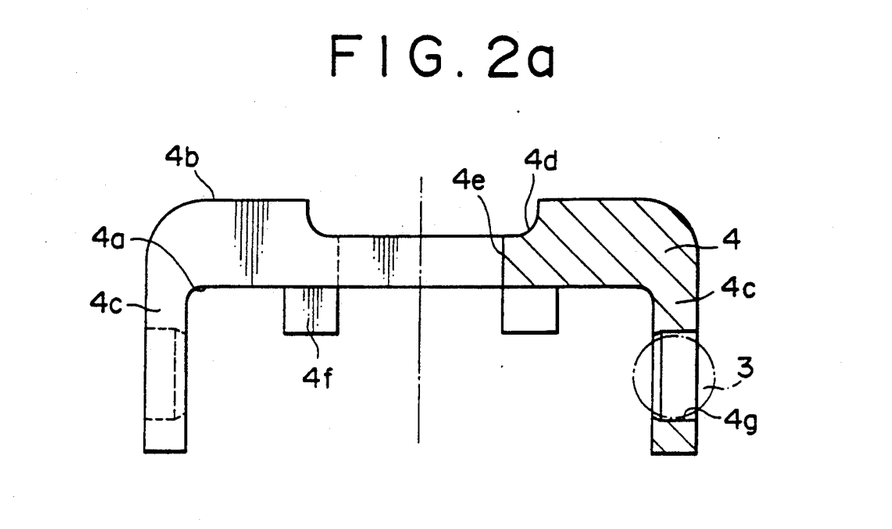
FIG. 2a is a schematic illustration showing in transverse cross section a retainer for retaining balls provided in the linear motion guide unit shown in FIGS. 1a through 1c.
Figure 2B:
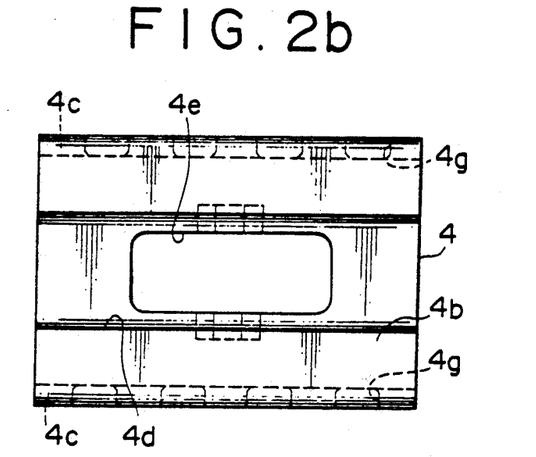
Figure 2C:
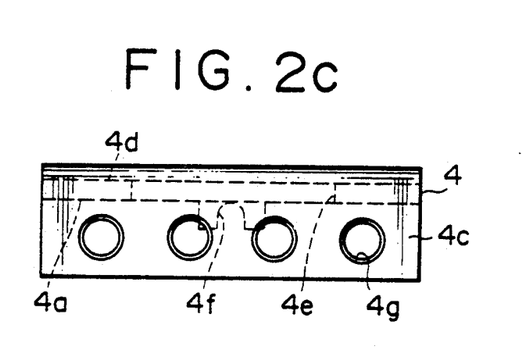
Figure 2D:
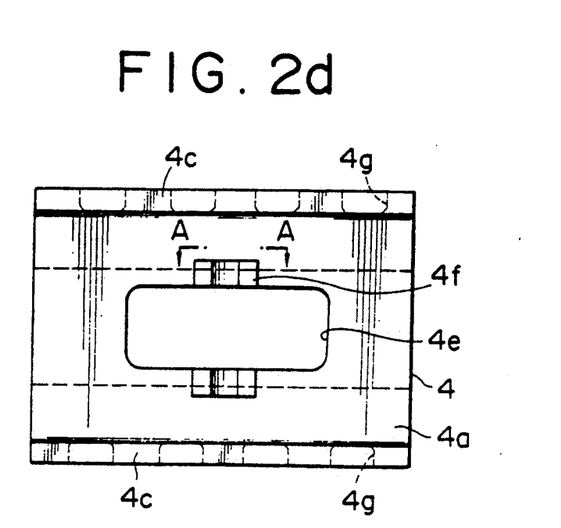
Figure 2E:
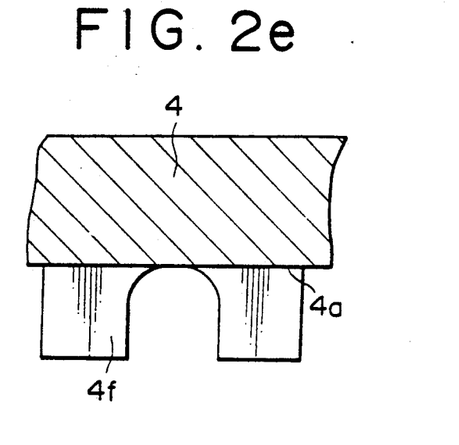
FIG. 2e is a schematic illustration showing on an enlarged scale a portion of the retainer when viewed in the direction indicated by arrows A in FIG. 2d.

In the illustrated embodiment, a plurality of balls 3 are located in each of the left and right guide channels, each defined between the outer and inner guide grooves 1d and 2d, so that the table 1 may move relative to the bed 2 slidingly through a rolling contact therebetween. In the illustrated embodiment, four balls 3 are located in each of the left and right guide channels, and a retainer 4 for retaining these balls 3 in relative position is also provided in the present LM guide unit. As best shown in FIGS. 1a and 2a, the retainer 4 is elongated in shape and has a generally inverted U-shaped cross section. Thus, the retainer 4 includes a generally horizontal top section 4b and a pair of vertically depending side sections 4c, 4c which extend generally vertically from the opposite sides of the top section 4b. As best shown in FIG. 2c, each of the side sections 4c is formed with four windows 4g circular in shape and spaced apart from each other in a direction in parallel with its longitudinal direction. Each of the windows 4g has a diameter slightly larger than the diameter of the ball 3 so that the ball 3 may be located inside the window 4g to be retained therein when assembled.

As shown in FIG. 2a, an elongated top center recess 4d is formed at the top surface of the top section 4b of the retainer 4. As will be made clear later, this top center recess 4d is provided for receiving therein a part of a top rack 6 fixedly mounted on the inner surface of the table 1. Such a structure is particularly advantageous since it allows to locate the retainer 4 as close as practically possible to the table 1, thereby contributing to make the entire structure compact in size, in particular in height. It is to be noted that the top center recess 4d extends end to end as best shown in FIG. 2b. Also as best shown in FIG. 2b, a slot 4e is formed in the top section 4b of the retainer 4. In the illustrated embodiment, the slot 4e is generally rectangular in shape, though the slot 4e should not be limited only to this particular shape. The slot 4e is located generally at the center of the table 4. As will become clear later, this slot 4e is a slot for receiving therein a part of a pinion gear 5 which will be in mesh with the top rack 6 mounted on the table 1 and also with a bottom rack 6 mounted on the bed 2.

A pair of bearing members 4f, 4f is provided on the opposite sides of the slot 4e as projecting downward from the inner surface of the retainer 4. Each of the bearing members 4f, 4f is so shaped to receive therein a shaft of the pinion gear 5 so that the pinion gear 5 may be rotatably supported when assembled. In the illustrated embodiment, the bearing member 4f has a generally inverted U-shaped cross section when viewed in the transverse direction, so that the bearing member 4f defines a receiving recess having an opening facing downward. Accordingly, the shaft of pinion gear 5 may be fitted into the receiving recess of the bearing member 4f from below. It is to be noted, however, that the bearing member 4f may be constructed to have any other structure. For example, as an alternative structure, the bearing member 4f may be so constructed to have a hole for receiving therein the shaft of pinion gear 5.

As briefly described before, the retainer 4 is also formed with a plurality of windows 4g, four on each side, in its side sections 4c, 4c. In the present LM guide unit, it is so structured that the retainer 4 does not come into contact with either of the table 1 and the bed 2 even if the retainer 4 moves in the longitudinal direction due to a relative motion between the table 1 and the bed 2. That is, the balls 3 are located in the guide channels between the table 1 and the bed 2 and each of the balls 3 is located in the corresponding one of the ball retaining windows 4g of the retainer 4. Thus, when the table 1 moves relative to the bed 2, the balls 3 roll between the table 1 and the bed 2 and thus the retainer 4 also move in the longitudinal direction. However, in the present LM guide unit, it is so structured that the retainer 4 does not come into contact with either of the table 1 and the bed 2 even if a relative motion is produced between the table 1 and the bed 2 in either direction. As a result, the overall sliding resistance or drag force is prevented from being increased.

When the preferred embodiment of the present LM guide unit is assembled as shown in FIG. 1a, a first predetermined gap D is set between the bottom surface of the top section 1b of the table 1 and the top surface of the top section 1b of the retainer 4 and also between the bottom surface of the top section 4b of the retainer 4 and the top surface of the side section 2c of the bed 2. Furthermore, a second predetermined gap d is set between the inner surface of the side section 1b of the table 1 and the outer surface of the side section 4b of the retainer 4 and also between the inner surface of the side section 4b of the retainer 4 and the outer surface of the side section 2c of the bed 2. It is to be noted, however, that the vertical gaps D and horizontal gaps d may be set differently, if desired.

As described before, the pinion gear 5 has a shaft 5a which is rotatably received in the bearings 4f when assembled. Thus, when the retainer 4 moves relative to the table 1 and the bed 2, the pinion 5 rotates. As best shown in FIG. 1a, in an assembled condition, the pinion 5 is partly located inside the slot 4e and its toothed portion 5b partly projects into the top center recess 4d of the retainer 4. Thus, the toothed portion 5b of pinion 5 is meshed with the top rack 6 fixedly mounted on the table 1.

Figure 3:
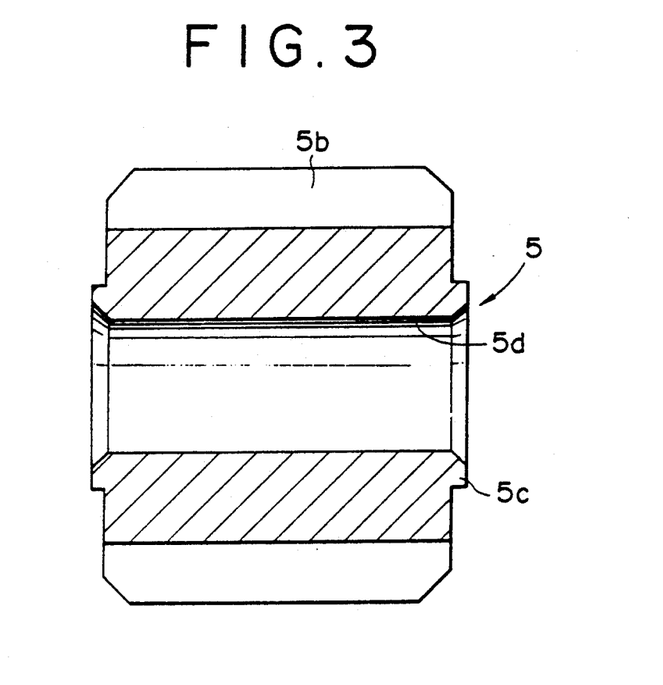
FIG. 3 is a schematic illustration showing on an enlarged scale a pinion gear provided in the linear motion guide unit shown in FIGS. 1a through 1c.

As shown in FIG. 3, the pinion 5 has a side projection 5c which projects sidewise over a predetermined distance in the form of a ring or collar around its through-hole 5d for receiving therein its shaft 5a. The through-hole 5d is bevelled on both ends as shown. With this structure, the contact between the pinion 5 and the side surface of the slot 4e of the retainer 4 is minimized since it is only that side project 5c that comes into sliding contact with the side surface of the slot 4e. In the preferred embodiment, the pinion 5 is formed from a synthetic resin material and the shaft 5a of stainless steel is press-fitted into the through-hole 5d. And, the pinion 5 is set in position with its shaft 5a rotatably received in the bearing members 4f, 4f. Alternatively, it may also be so structured that the shaft 5a is fixedly mounted on the bearing members 4f, 4f with the pinion 5 rotatably supported on the stationary shaft 5a.

Figure 4:
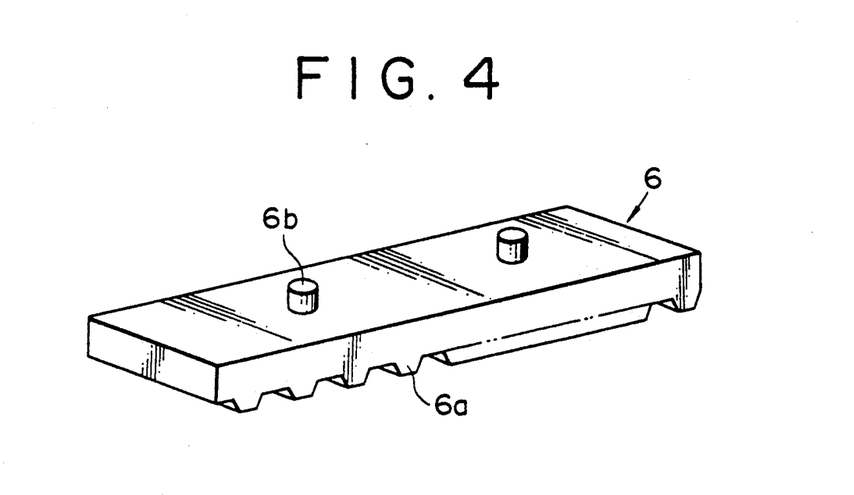
FIG. 4 is a schematic illustration showing in perspective view a top rack provided in the linear motion guide unit shown in FIGS. 1a through 1c.

Preferably, the top or bottom rack 6 is formed from a plastic material by injection molding. As shown in FIG. 4, the rack 6 is generally elongated in shape and provided with a toothed portion 6a at its one surface so as to be meshed with the toothed portion 5b of the pinion 5. The other or mounting surface of the rack 6 is generally flat so as to be brought into surface contact with an associated surface of the table 1 or bed 2. In the illustrated embodiment, a pair of mounting projections 6b, 6b is provided on the mounting surface of the rack 6. These mounting holes 6b are fitted into the corresponding mounting holes 1e (2e) of table 1 (bed 2) when the rack 6 is mounted in position. In the preferred embodiment, these mounting projections 6b are sufficiently long to extend beyond the mounting holes 1e and 2e and thus the top portions of these mounting projections 6b extending beyond the mounting holes 1e and 2e may be heated to have them deformed to have the rack 6 fixedly mounted on the table 1 or the bed 2. Thus, as shown in FIG. 1a, when assembled, the toothed portion 6a of the top rack 6 mounted on the table 1 is partly located in the space defined by the top center recess 4d of the retainer 4, so that the toothed portion 5b of the pinion 5 is set in mesh with the toothed portion 6a of the top rack 6 mounted on the table 1. With this structure, due to a meshing relation between the pinion 5 and the top rack 6, the stroke in movement of the retainer 4 is accurately constrained to a half of the stroke of the table 1, so that positional shifting of the retainer 4 is prevented from occurring.

With the above-described first embodiment of the present invention, since the top center recess 4d is formed in the retainer 4, the retainer 4 may be located as close as practically possible and thus the gap or clearance between the retainer 4 and the table 1 may be minimized. As a result, there can be provided a LM guide unit having a slippage preventing mechanism (rack and pinion in the illustrated embodiment) extremely compact in the overall size, in particular its height. Besides, since the retainer 4 can be formed to have a maximum allowable thickness utilizing the space between the table 1 and the bed 2, it has a sufficient resistance against deformation due, for example, to external forces, such as torsional or twisting forces. Thus, the retainer 4 can properly retain the balls 3 in position and thus the overall performance of the LM guide unit can be maintained virtually unchanged during operation under any load conditions.

Now, a reference will be made to FIGS. 5 and 6a through 6e, schematically showing a LM guide unit constructed in accordance with another embodiment of the present invention. Since this embodiment of the present LM guide unit is similar in many respects to the first embodiment, like elements are indicated by like numerals.

Figure 5:
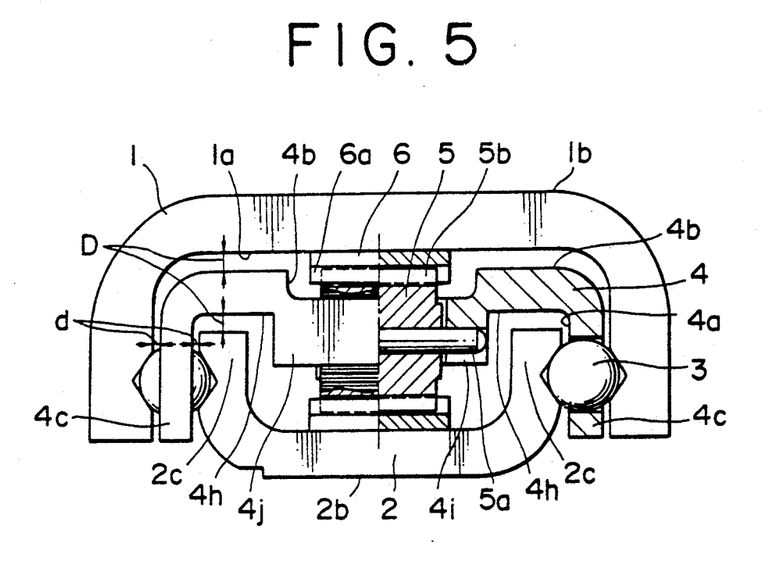
FIG. 5 is a schematic illustration showing in transverse cross section a linear motion guide unit constructed in accordance with another embodiment of the present invention.
Figure 6A:
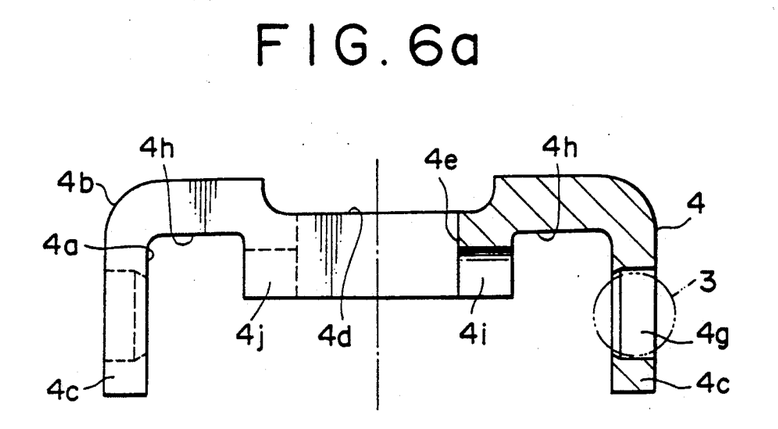
FIG. 6a is a schematic illustration showing in transverse cross section a retainer for retaining a plurality of balls provided in the linear motion guide unit shown in FIG. 5.
Figure 6B:
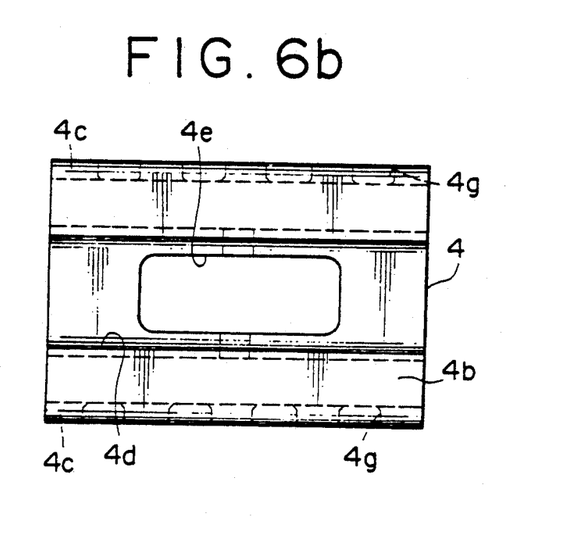
Figure 6C:
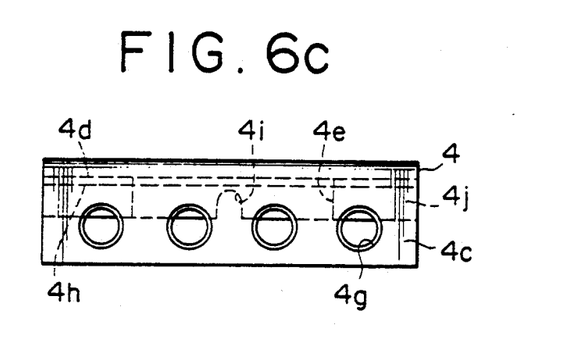
Figure 6D:
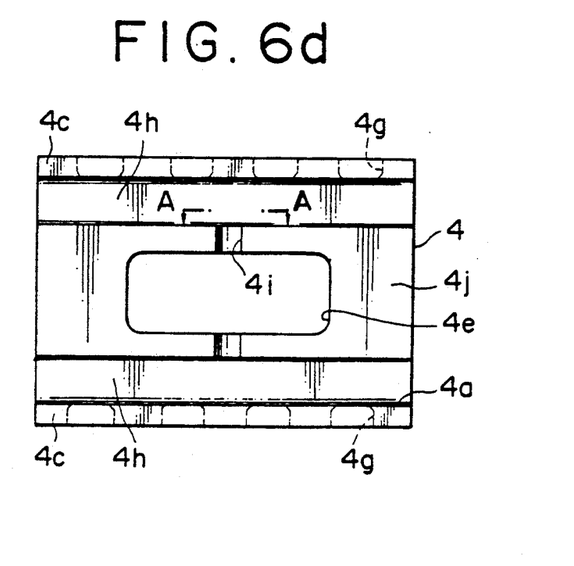
Figure 6E:
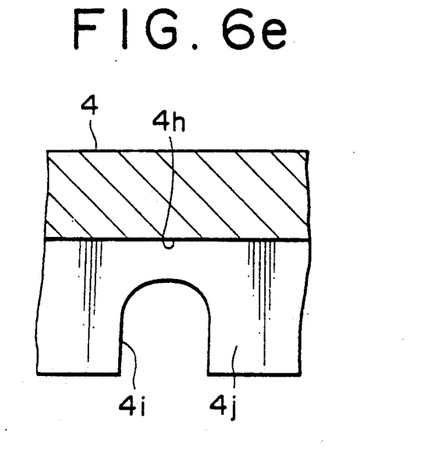
FIG. 6e is a schematic illustration showing on an enlarged scale a portion of the retainer when viewed in the direction indicated by arrows A in FIG. 6d.

In the present embodiment, as best shown in FIGS. 5 and 6a, the retainer 6 has a somewhat different structure. That is, the retainer 6 in the present embodiment is formed with a pair of bottom side recesses 4h, 4h at the bottom surface of its top horizontal section 4b. In the illustrated embodiment, each of the bottom side recesses 4h, 4h extends in parallel with the longitudinal direction adjacent to its corresponding side section 4c. As a result, as best shown in FIG. 6a, the retainer 4 in this embodiment has a generally M-shaped cross sectional shape. The top horizontal section 4b includes a thick center portion 4j which is located between the pair of bottom side recesses 4h, 4h and which extends end-to-end in the longitudinal direction of the retainer 4. And, the slot 4e for partly receiving therein the pinion 5 is formed in the thick center portion 4j approximately at its center. In addition, the thick center portion 4j is also formed with a pair of shaft receiving recesses 4i, 4i serving as bearing members located on the opposite sides of the slot 4e and extending in the transverse direction. The shaft receiving recesses 4i, 4i are opened at their bottoms so as to rotatably receive therein the shaft 5a of the pinion 5 when assembled. As an alternative structure, holes may be formed instead of recesses 4i similarly with the previously described embodiment.

As will be appreciated, in the present embodiment, due to the provision of the bottom side recesses 4h, 4h in the retainer 4, the retainer 4 can be located as close as practicably possible to the bed 2, so that the overall size, in particular the height, of the LM guide unit can be further reduced. Moreover, since the table 1 and the bed 2 are also located closer together with the present embodiment, use may be made of a smaller pinion, which, in turn, allows to reduce the moment of inertia so as to reduce the sliding resistance of the LM guide unit. Furthermore, since the bearing members or shaft receiving recesses 4i are integrally formed in the thick center portion 4j of the retainer 4, the amount of deformation is minimized in the part which supports the shaft 5a of the pinion 5, which contributes to guide the movement of pinion 5 significantly accurately.

While the above provides a full and complete disclosure of the preferred embodiments of the present invention, various modifications, alternate constructions and equivalents may be employed without departing from the true spirit and scope of the invention. For example, use has been made of a single pinion in each of the embodiments described above, two or more pinions arranged in a single row can be also be used, if desired. Thus, the above description and illustration should not be construed as limiting the scope of the invention, which is defined by the appended claims.

What is claimed is:

1. A linear motion guide unit, comprising:

an elongated table having a generally U-shaped cross section, said table including a first horizontal section and a pair of first vertical sections, each extending vertically from a corresponding side of said first horizontal section;

an elongated bed having a generally U-shaped cross section, said bed including a second horizontal section and a pair of second vertical sections, each extending vertically from a corresponding side of said second horizontal section and said bed being oriented with its inner surface facing an inner surface of said table so that each of said first vertical sections is located opposite to a corresponding one of said second vertical sections at least partly;

first guiding means provided in each of said first vertical sections;

second guiding means provided in each of said second vertical sections, said second guiding means being located opposite to said first guiding means to thereby define a pair of guide channels between said table and said bed;

a plurality of rolling members located in said pair of guide channels so as to provide a rolling contact between said table and said bed;

an elongated retainer including a third horizontal section and a pair of third vertical sections, each extending vertically from a corresponding side of said third horizontal section, each of said third vertical sections being located in a space defined between one of said first vertical sections, and a corresponding one of said second vertical sections, said third vertical sections being formed with a plurality of windows spaced apart from each other for receiving therein said plurality of rolling members, said third horizontal section being formed with at least one slot;

at least one pinion gear rotatably supported at a center in the widthwise direction of said third horizontal section of said retainer such that said pinion gear partly extends beyond said slot; and a pair of top and bottom racks fixedly mounted on said table and said bed and extending in parallel with a longitudinal direction of said unit and having transverse teeth at a center in the widthwise direction of said table and said bed, respectively, such that said pinion gear is in mesh at said center with said transverse teeth of said top and bottom racks.

2. The linear motion guide unit of claim 1, wherein said rolling members are balls having a predetermined diameter.

3. The linear motion guide unit of claim 2, wherein each of said first and second guiding means is an elongated groove formed in a surface of each of said first and second vertical sections, said groove extending in a direction parallel to a longitudinal direction of said unit.

4. The linear motion guide unit of claim 1, wherein said third horizontal section of said retainer is formed with a center recess so as to receive one of said top and bottom racks at least partly.

5. The linear motion guide unit of claim 1, wherein said third horizontal section of said retainer is formed with a pair of side recesses so as to receive end portions of either of said first and second vertical sections at least partly.

6. The linear motion guide unit of claim 1, wherein said pinion gear is formed with a pair of side projections which extend around a shaft of said pinion gear and which may be brought into contact with side surfaces of said slot during operation.

7. The linear motion guide unit of claim 1, wherein said third horizontal section of said retainer has a generally M-shaped cross section and is formed with a center recess so as to receive one of said top and bottom racks at least partly and with a pair of side recesses so as to receive end portions of either of said first and second vertical sections at least partly, said third horizontal section including a thick center portion in which said slot is formed.

* * * * *